(12) United States Patent
Griesemer

(10) Patent No.: US 6,742,013 B2
(45) Date of Patent: May 25, 2004

(54) APPARATUS AND METHOD FOR UNIFORMLY PERFORMING COMPARISON OPERATIONS ON LONG WORD OPERANDS

(75) Inventor: Robert Griesemer, Palo Alto, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 481 days.

(21) Appl. No.: 09/848,976

(22) Filed: May 3, 2001

(65) Prior Publication Data

US 2003/0033342 A1 Feb. 13, 2003

(51) Int. Cl.[7] .............................. G06F 7/50; G06F 7/00
(52) U.S. Cl. ........................................ 708/670; 708/525
(58) Field of Search ................................ 708/670, 525; 340/146.2

(56) References Cited

U.S. PATENT DOCUMENTS

| 4,878,189 A | | 10/1989 | Kawada | .................. 364/736.5 |
| 4,888,722 A | * | 12/1989 | Boreland | .................... 708/525 |
| 6,018,757 A | * | 1/2000 | Wong | ......................... 708/525 |

FOREIGN PATENT DOCUMENTS

| WO | WO9617292 | 6/1996 | ............. G06F/7/20 |

OTHER PUBLICATIONS

Patent Abstracts of Japan, JP 59 121538A (Mitsubishi Electric Corp.), Jul. 13, 1984, Data Processor.
"Compare Status Accumulator", Research Disclosure, Kenneth Mason Publications, Hampshire B, No. 277, May 1, 1987, p. 319 XP000748553.

* cited by examiner

*Primary Examiner*—Tan V. Mai
(74) *Attorney, Agent, or Firm*—Beyer Weaver & Thomas, LLP

(57) ABSTRACT

Using a subtraction without borrow operation, the first operand lowest order word is subtracted from a second operand lowest order word. If the result of the subtracting is not zero, then a zero (Z) flag is cleared such that a Z flag status is not set. If, however, the result of the subtracting is zero, then the Z flag is set as usual. Next, a first operand next higher order word is subtracted from a second operand next higher order word using a subtraction with borrow and a sticky not Z flag (SBBZ) instruction and, based upon the subtracting, the Z flag is updated accordingly such that it represents the result of the whole multi-word subtraction until the first operand highest order word is subtracted from the second operand highest order word. The comparing of the first operand and the second operand is then based upon the Z flag status, if needed, after the subtraction of the first operand highest order word is subtracted from the second operand highest order word.

7 Claims, 3 Drawing Sheets

APPARATUS AND METHOD FOR UNIFORMLY PERFORMING COMPARISON OPERATIONS ON LONG WORD OPERANDS

BACKGROUND OF THE INVENTION

1. Field of the Invention

The present invention relates to computing, and more particularly, to a method, system, and apparatus for uniformly performing comparison operations on operands represented by more than one machine word. More specifically, the invention describes a new computer instruction that is used for performing long word comparison operations.

2. Description of Prior Art

Many popular CPU's, such as the Intel IA32 family, the SPARC™ processor from Sun Microsystems, Inc., the Power PC from IBM, and the Alpha processor from Digital Equipment Corporation, each have their own instruction set. When a programmer wishes to write a program to be executed by a particular CPU, the programmer composes the program from the corresponding instruction set. To run the program, the instructions are converted into machine instructions that are then executed by the CPU in program order.

Integer values are stored as words in the registers of the CPU whose size is defined by the particular CPU architecture. For example, in a 32-bit machine architecture, the word size is 32 bits. The registers in such a machine are therefore 32 bits wide.

The execution of an ADD or SUB instruction at the machine level is relatively straightforward. The corresponding bit positions of the two registers defined by the instruction are added or subtracted bit by bit from the least significant bit (LSB) to the most significant bit (MSB). Instruction sets also include a type of instruction generally called a conditional branch. With these types of instructions, execution typically continues at a new address which is specified with the conditional branch if the condition is met. If the condition is not met, execution usually continues with the next instruction in program order. A conditional branch tests if a particular condition occurred by analyzing certain flags. Typically, most CPUs store these certain flags in what is commonly referred to as the condition code register (CC register). CC registers usually hold a multitude of different flags, including but not exclusive, the sign flag S, the overflow/underflow flag V, the carry/borrow flag C, and the zero flag Z. Different conditional branches test for different conditions by checking for different flags to be set/cleared in the condition code register. For example, a conditional branch testing for the "is zero" condition will test if the Z flag is set in the CC register at the time of the execution of the conditional branch. If the Z flag is set in the CC register, the conditional branch will continue at the new address, otherwise it will continue with the next instruction in program order.

The flags in condition code registers can be set via a multitude of ways. However, most CPUs automatically set the flags in the CC register according to the result of the previous instruction. For example, most CPUs have an ADD or SUB instruction that adds or subtracts the integer values stored in two registers, and then stores the result in one of the two or a third register. Usually, the ADD or SUB instruction will also update the flags in the CC register such that the status of the flags reflect the outcome of the result. For example, if the result after ADD or SUB is zero, the Z flag will be set in the CC register. Similarly, whenever a carry or borrow occurs, a carry flag C is set so that the hardware performing the addition or subtraction can take the carry or borrow condition into account for the next MSBs. One problem with addition or subtraction is that the sum or difference of the two integer operands may be too large or small to be represented in a 32-bit wide register. This event is called overflow with addition and underflow with subtraction. When an overflow/underflow condition occurs, an underflow/overflow flag V is set to indicate that the sum or difference of the two operands is too large or small to be represented in the register.

Usually, an ADD or SUB instruction (and many other instructions, for that matter) followed by a conditional branch instruction can be used together to control the execution of the program depending on the relation between two integer values. For example, if a conditional branch should occur depending on whether two integer values X1 and X2 are the same, the necessary instruction sequence would look as follows for many CPUs: First, the values of X1 and X2 are moved into corresponding registers R1 and R2. Then, a SUB instruction is used to subtract R2 from R1, and store the result in either R1, R2 or another register R3. The SUB instruction will also set the CC register's flags depending on the result of the subtraction. If both X1 and X2 are the same, the result will be zero, otherwise it will not be zero. The Z flag in the CC register will be set automatically by the SUB instruction if the result is zero, otherwise it will be cleared. Thus, if and only if the Z flag is set in the CC register, X1 and X2 are the same. Therefore, a conditional branch testing the Z flag can be used to change the flow of a program depending on whether the two operands X1 and X2 are the same or not.

Because comparison of two integer values is a very important operation, most CPUs provide a special compare instruction CMP for that purpose. Such a CMP instruction usually behaves exactly like a SUB instruction, except that it does not store the result of the subtraction in one of the two or a third register. But like the SUB instruction, a CMP instruction updates the flags in the CC register. Thus, the CMP instruction is specially made to just subtract two integer values and update the CC accordingly, but discards the actual result. The advantage of the CMP instruction is that no register is changed to hold the result of the subtraction operation. Thus, the CMP instruction simply updates the flags in the CC register depending on the relation between the two integer values. A CMP instruction is usually followed by a conditional branch which tests the flags for a particular condition, depending on the relation that needs to be tested. In this way, conditional branches testing the CC flags can be used to change the flow of a program depending on the result of the comparison operation of the two operands.

It should be noted that the CMP instruction is helpful but not necessary, and that it can always be replaced with a SUB instruction if an extra unused register is available to store the result. For that reason and to not unnecessarily obscure the scope of the present invention, in the following we will not use CMP, but SUB instead. Table 1 below provides a listing of the relationship between certain relations for unsigned and two's complement (i.e., signed) integer arithmetic and their corresponding flag settings. It suffices to say that most instruction sets provide conditional branch instructions testing the CC flags for conditions corresponding to the following relations: equal (=), not equal (!=), less than (<), less than or equal (<=), greater than (>), or greater than or equal (>=). It should also be noted that the conditions to be tested for these relations are different for signed (two's complement) and unsigned integer arithmetic.

TABLE I

| RELATION | FLAGS | DESCRIPTION (Two's Complement) | FLAGS | DESCRIPTION (Unsigned) |
|---|---|---|---|---|
| = | Z | If the Z flag is set, indicating that the difference between the compared operands is zero, the condition is met. | Z | If the Z flag is set, indicating that the difference between the compared operands is zero, the condition is met. |
| ≠ | not Z | If the Z flag is not set, it indicates the compared operands are not the same and the condition is met. | not Z | If the Z flag is not set, it indicates the compared operands are not the same and the condition is met. |
| < | S ≠ V | If the S flag is set but there is no overflow, it indicated that the result of the subtraction is negative and the condition is met. | C | If the carry flag C is set, then the condition is met. |
| ≤ | S ≠ V or Z | This condition is met if the S and V flags are not the same as described above with regard to the (<) relation or if the Z flag is set indicating the two operands are the same. | C or Z | If the carry flag C or the zero flag Z is set, then the condition is met. |
| > | S = V and not Z | This condition is met if S and V are both set indicating that the difference is positive and Z is not set indicating that the values are not the same. | Not C and not Z | If both the carry flag C and the zero flag Z are not set, then the condition is met. |
| ≥ | S = V | This condition is met if both the S and V flags are set | Not C | If the carry flag C is not set, then the condition is met |

In this way, a conditional branch testing the CC flags can be used to change the control flow of a program depending upon the result of the comparison operation of the two operands. However, many programming languages, such as JAVA, Smalltalk, and C++, and the like, support arithmetic operations and comparisons of integer values more than one machine word wide. For example, a long integer in the JAVA programming language is 64-bits wide and therefore requires two words in a 32-bit machine (such as would be required in an Intel X86 architecture) to be represented. In other languages like Smalltalk, integer values can be arbitrarily long and thus may require multiple words to be represented.

As described above, comparing two 1-word integers essentially requires the subtraction of the two 1-word integers with a SUB instruction. The SUB instruction in turn will set the flags in the CC register accordingly and, if desired, a conditional branch testing the CC register flags can be used to change the program flow depending on the outcome of the comparison. Consequently, comparing two n-word integers (where n is greater than or equal to 1) should be done in the same way as is 1-word integers, by subtracting the two n-word integers and testing the CC register flags afterwards. For example, a 64 bit word $D_1$ can be stored in two 32 bit registers ($R_1$ and $R_2$) in a 32 bit machine as shown in FIG. 1. Using the arrangement shown in FIG. 1, the register $R_2$ stores the least significant 32 bits of the 64 bit data word $D_1$ as a least significant word (LSW) $D_{1L}$ while the register $R_1$ is used to store the most significant 32 bits as a most significant word (MSW) $D_{1H}$. Similarly, a 64 bit word $D_2$ can be stored in two 32 bit registers ($R_3$ and $R_4$) where the register $R_3$ stores the 32 bit LSW of the 64 bit data word $D_2$ (i.e; $D_{2L}$) and the register $R_4$ is used to store the 32 bit MSW of the 64 bit data word $D_2$ (i.e; $D_{2H}$).

As described above, the CC flags S, Z, V, and C are the flags tested by conditional branches for the six primitive compare operations (<, >, =, ≠, ≤, ≥). The S flag depends only on the sign of the result (which is the most significant bit in a 2's complement representation), while the V flag indicates internal carry for the second most significant bit to the most significant bit of the result, and the C flag indicates carry to or borrow from the next word. Since the S, V, and C flags depend only on the operation applied and result obtained for the most significant word of an n-word integer, the S, V, and C flags are correctly set for both 1 and n-word subtractions using either a conventional SBB (subtraction with borrow) or a SUB operation. In order, therefore, to compare the n-word data words $D_1$ and $D_2$, the LSWs of each data word (i.e., $D_{1L}$ and $D_{2L}$) and the MSWs (i.e., $D_{1H}$ and $D_{2H}$) of each data word are subtracted from each other using what is referred to as a subtraction (SUB) without borrow instruction and a subtraction with borrow (SBB) instruction. It should be noted that the first subtraction uses the SUB operation since the first subtraction needs to set the Z flag based upon the result of the subtraction and ignore the C flag. Also, it should be noted that the SBB instruction is working like the SUB instruction, but that it additionally takes into account the state of the C flag for the subtraction (in which case the C flag indicates "borrow").

Unfortunately, however, the Z flag depends on all bits of an integer and if the integer is represented by more than one data word, information about the bits of all words must be comprehended in the computation. Since the subtraction of two n-word integers requires n subtractions starting with the least significant word, and since the SBB operation sets the Z flag only according to the result of the most recent SBB operation, the conditional operations that require testing of the Z flag (i.e., >, ≤, ≠, and =) will not work properly. For example, using the comparison of long data words $D_1$ and $D_2$, the result of the SBB operation on the MSWs of $D_1$ and $D_2$ will be the only result comprehended in the state of the Z flag regardless of the results of previous SBB operations for the lower order words.

Therefore, in order for multi-word comparison to be a uniform extension of the single-word comparison, what is required is a subtraction operation that maintains information about all the bits in comparing two n-word integers.

SUMMARY OF THE INVENTION

The invention relates to a method, apparatus and system for comparing a first multi-word operand with a second multi-word operand. In one embodiment, the first multi-word operand is formed of n words (where n is greater than or equal to 1) hierarchically arranged from a first operand lowest order word (LSW) to a first operand highest order word (MSW) while the second operand is formed of n words hierarchically arranged from a second operand lowest order word (LSW) to a second operand highest order word (MSW).

As a method, using a subtraction without borrow operation, the first operand lowest order word is subtracted from a second operand lowest order word. If the result of the subtracting is not zero, then a zero (Z) flag is cleared such that a Z flag status is not set. If, however, the result of the subtracting is zero, then the Z flag is set as usual. Next, a first operand next higher order word is subtracted from a second operand next higher order word using a subtraction with borrow and a sticky not Z flag (SBBZ) instruction and, based upon the subtracting, the Z flag is updated accordingly until the first operand highest order word is subtracted from the second operand highest order word. The comparing of the first operand and the second operand is then based upon the Z flag status, if needed, after the subtraction of the first operand highest order word is subtracted from the second operand highest order word. In this way, the method can be used for comparing the multi-word width operands of any conditional branch instruction which defines one of the following relations: equal (=); not equal ($\neq$); less than (<); less than or equal ($\leq$); greater than (>); or greater than or equal ($\geq$).

In another embodiment, a CPU configured to execute a machine instruction requiring a comparison of two multi-word operands for execution is described. The CPU includes a zero (Z) flag, subtraction circuitry configured to perform a subtraction operation on each of the words of the two multi-word operands respectively, and reset circuitry configured to reset the Z flag such that a Z flag status is not set if any of the subtraction operations on the two multi-word operands is not zero.

BRIEF DESCRIPTION OF THE DRAWINGS

The present invention is illustrated by way of example, and not by way of limitation, in the figures of the accompanying drawings, wherein like reference numerals refer to analogous or similar elements to facilitate ease of understanding.

DETAILED DESCRIPTION OF THE INVENTION

Figure 1:
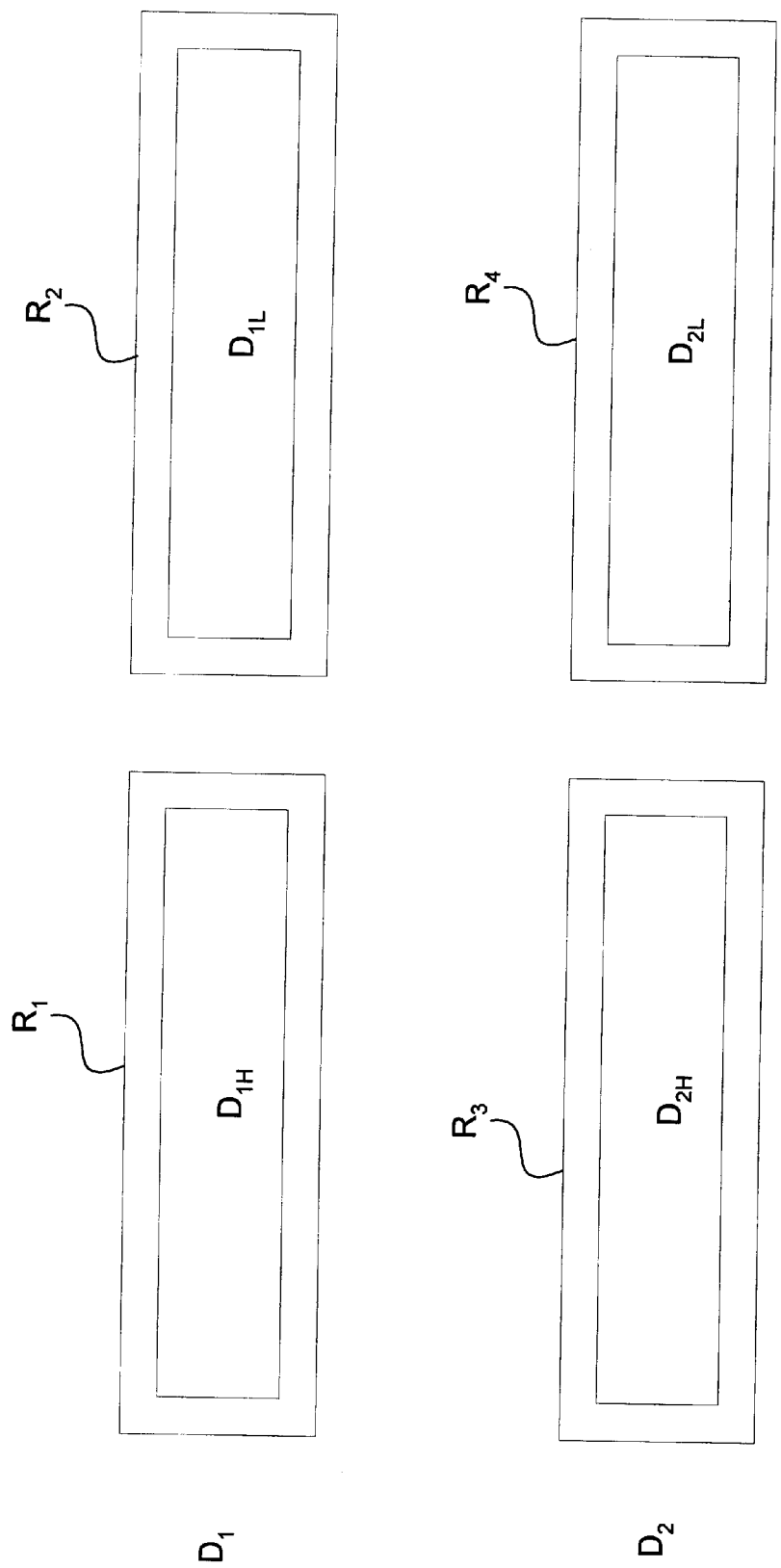
FIG. 1 shows an exemplary multi-word integer.

In the following description, numerous specific details are set forth in order to provide a thorough understanding of the present invention. It will be apparent, however, to one skilled in the art that the present invention may be practiced without some or all of these specific details. In other instances, well known structures or operations have not been described in detail in order to not unnecessarily obscure the invention.

All modern computing architectures provide what is referred to as a subtraction without borrow (SUB) as well as a subtraction with borrow (SBB) instruction that are used to set a condition code register to any of a number of condition code (CC) flags which is used for conditional branches. These condition flags are the sign (S) flag, the overflow/underflow (V) flag, the carry (C) flag, and the zero (Z) flag. In the described embodiment, the S flag depends only on the sign of the result (which is the most significant bit in a 2's complement representation), the V flag indicates internal carry for the second most significant bit to the most significant bit of the result, the C flag indicates carry or borrow for the next word, while the zero flag Z signifies if the difference between the compared operands is zero. Since the S, V, and C flags depend only on the operation applied and result obtained for the most significant word (MSW) of an n-word integer, these condition codes are correct for both 1 and n word integers using the conventional SBB instruction. Since, however, the conventional SBB instruction sets the Z flag only according to the result of the last and most recent subtraction operation, the conditional operations that depend on the Z flag status for the whole multiword subtraction (i.e., >, $\leq$, $\neq$, and =) are not correct.

Therefore, the invention corrects this problem by establishing a new subtraction instruction referred to as subtraction with borrow and sticky not Z flag, or more simply, SBBZ. In the described embodiment, the SBBZ instruction provides that the Z flag is updated based upon the following conditions:

1) if the result of the SBBZ instruction is not zero, then the Z flag is cleared (i.e., the Z flag status is "not set");

2) in all other cases the Z flag is not changed.

In this way, once the Z flag is cleared, it remains cleared (i.e., the "not Z" information is "sticky" in that it flows through bits of the computation regardless of the number n of words used to represent an integer). It should be noted that the SBBZ instruction can be used in a manner substantially the same as the conventional SBB instruction except, unlike the SBB instruction, if during the subtraction steps of the SBBZ instruction, if any one of the n word results are not zero, the Z flag is cleared.

The invention will now be described in terms of a digital computing system. However, it should be noted, that the inventive subtraction instruction can be used in any system where comparison of multiple word integers in any suitable representation is used.

Figure 2:
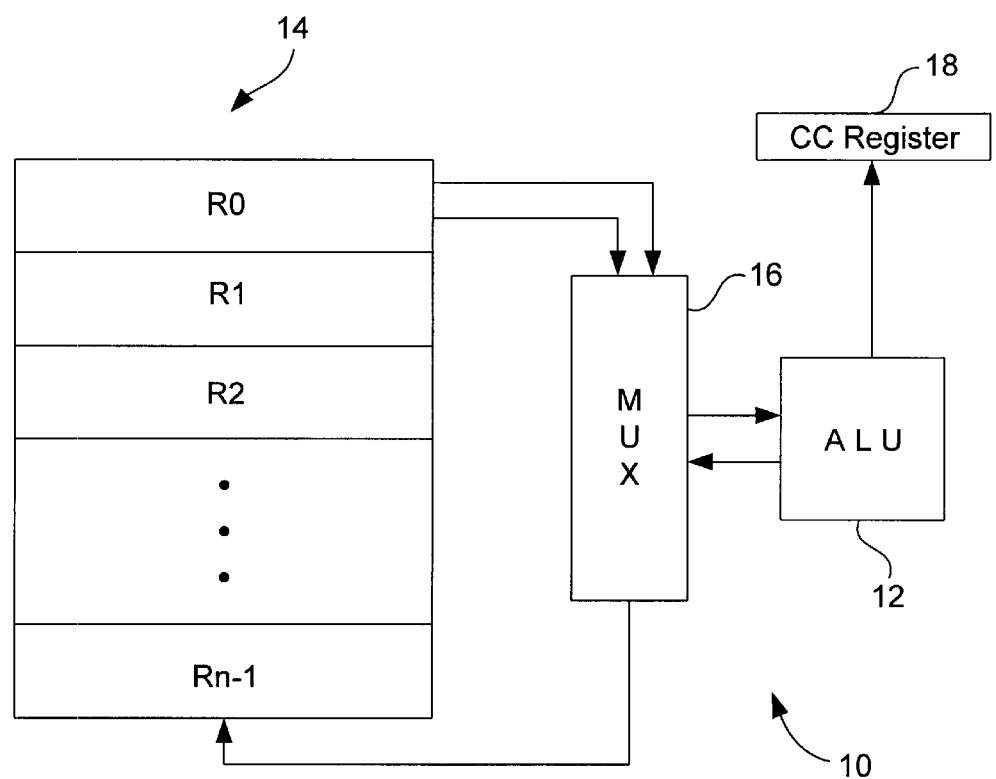
FIG. 2 is a block diagram of a CPU capable of executing the subtraction instruction for long words in accordance with the present invention.

Referring to FIG. 2, a block diagram of a CPU 10 capable of uniformly performing comparisons of multi-word length operands by using an SBBZ instruction is shown. The CPU 10 includes an algorithmic unit (ALU) 12, a register file 14 including a plurality of registers $R_1$ through $R_{n-1}$, multiplexer 16, and a CC register 18. During operation, the instructions of a program are executed in the ALU 12. Just prior to execution, any source register values needed by an instruction are ascertained and fetched by the multiplexer 16 from the register file 14. The instruction is then executed and the result is provided to a destination register in the register file 14 by the multiplexor 16.

During a comparison operation in which the CPU 10 uses a subtraction without borrow (SUB) instruction for a first word subtraction and the SBBZ instruction thereafter, the Z flag is cleared (i.e., status is "not set") if any of the results indicates that the compared words are not equal, otherwise the Z flag remains unchanged. The Z flag therefore is set only if the whole result (and thus each SUB result) is equal to zero.

Operation of the SBBZ instruction is best described using an example. Consider the subtraction of two n-word integers X and Y (where n is greater than or equal to 1). The n-word integers X and Y can be represented as:

$X = X_{n-1}, X_{n-2} \ldots X_1, X_0$ $Y = Y_{n-1}, Y_{n-2} \ldots Y_1, Y_0$;

where $(X_0, Y_0)$ and $(X_{n-1}, Y_{n-1})$ are the least significant word (LSW) and most significant word (MSW), respectively of the integers X and Y.

During execution, the least significant words ($X_0$, and $Y_0$) are first subtracted (using a subtraction without borrow instruction). If the two operands ($X_0$ and $Y_0$) are the same, meaning the difference equals zero, then the value of the Z flag is set. If, they are not equal, the Z flag is reset. The next higher order words ($X_1$, and $Y_1$), are then compared using the inventive SBBZ instruction which is repeated for each pair of words until $X_{n-1}$ and $Y_{n-1}$ are subtracted. The following subtraction instructions represent the machine sequence required to perform the compare of the multi-word operands X and Y in accordance with the present invention (note that some CPUs require a third register to be specified to hold the result of each individual SUB or SBBZ instruction—since we are only interested in the final setting of the CC register flags, these extra register specifications have been left out for simplicity):

| | |
|---|---|
| SUB | $X_0, Y_0$ |
| SBBZ | $X_1, Y_1$ |
| • | |
| • | |
| • | |
| SBBZ | $X_{n-1} Y_{n-1}$ (where n ≧ 1) |

When the most significant words (i.e., $X_{n-1} Y_{n-1}$) are subtracted, the C, S and V flags are set, respectively, based upon the carry, sign and overflow/underflow conditions of the final subtraction result. The Z flag is based upon the subtraction results of all the subtractions performed for all n words and not (as with the conventional SBB or SUB instruction) only on the subtraction result of the MSW. In this way, any non-zero result is carried through (i.e., the sticky nature of the Z flag) and is comprehended in the condition code represented by the Z flag such that all condition codes based upon the Z flag are correct.

A particular example using decimal representation of integers is shown in Table III.

In the example shown in Table II, an integer X is represented as the decimal integer (73421095) with "5" being the LSW and "7" being the MSW. In a similar way, an integer Y is represented as the decimal integer (73420095) with "5" being the LSW and "7" being the MSW. The comparison operation between X and Y proceeds from the LSW to the MSW with the result determining the status of the Z flag as shown. As can be seen, the Z flag is set until the respective comparison results in a non-zero result at which time the Z flag is reset (i.e., the Z flag status is "not set"). Since all subsequent subtractions result in a zero result, the Z flag status remains "not set" thereby carrying this Z flag status through to the MSW subtraction result which results in the conditional operations that require testing of the Z flag status (i.e., >, ≦, ≠, and =) to be correct. Table III also shows a second example where the integer Y is now represented by the decimal integer (73220095) illustrating that even if subsequent subtractions result in a non-zero result, the not Z flag remains "sticky" throughout.

TABLE II

| X | 7 | 3 | 4 | 2 | 1 | 0 | 9 | 5 |
|---|---|---|---|---|---|---|---|---|
| Y | 7 | 3 | 4 | 2 | 0 | 0 | 9 | 5 |
| Z | Not Z | Not Z | Not Z | Not Z | Not Z | Z | Z | Z |
| X | 7 | 3 | 4 | 2 | 1 | 0 | 9 | 5 |
| Y | 7 | 3 | 2 | 2 | 0 | 0 | 9 | 5 |
| Z | Not Z | Not Z | Not Z | Not Z | Not Z | Z | Z | Z |

Figure 3:
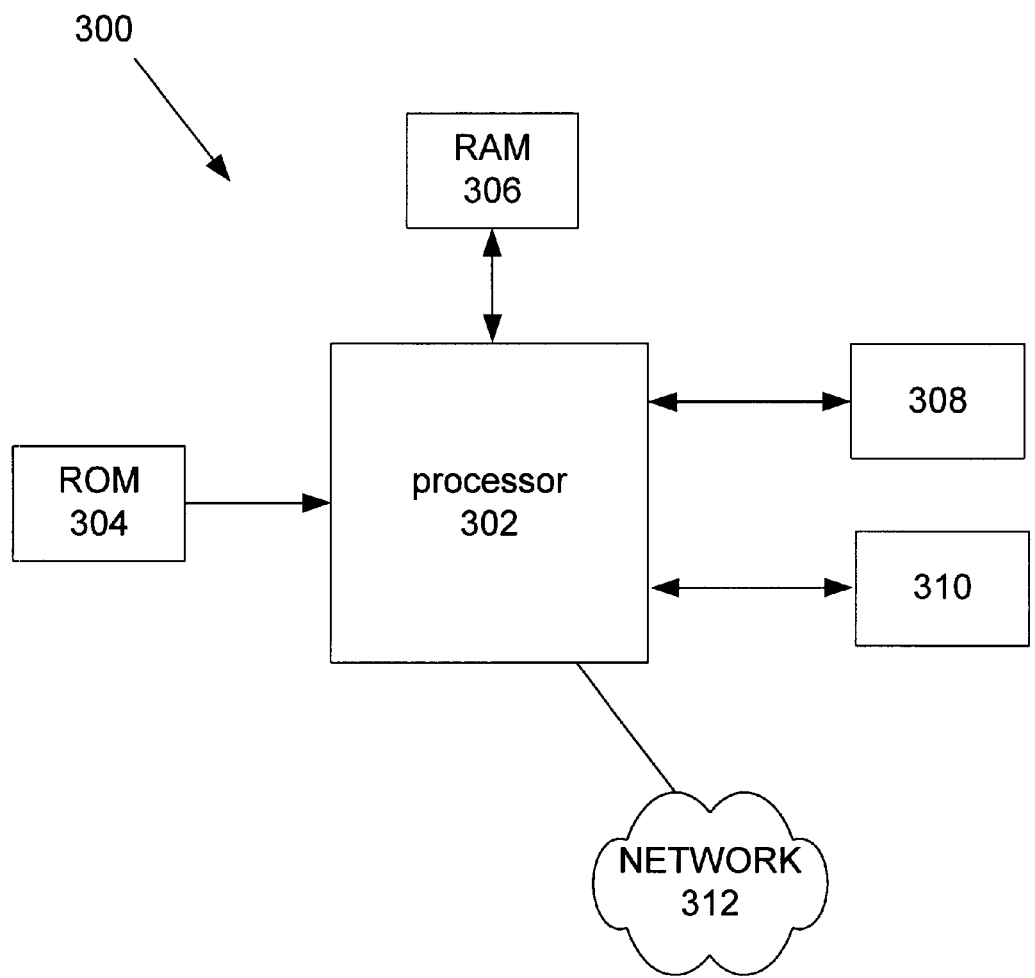
FIG. 3 is a logic diagram of circuitry in the CPU used to implement the subtraction instruction of the present invention.

FIG. 3 illustrates a typical, general-purpose computer system suitable for implementing the present invention. The computer system 330 includes at least one processor 332 (also referred to as a central processing unit, or CPU) that is coupled to memory devices including primary storage devices 336 (typically a read only memory, or ROM) and primary storage devices 334 (typically a random access memory, or RAM).

Computer system 330 or, more specifically, CPUs 332, may be arranged to support a virtual machine, as will be appreciated by those skilled in the art. One example of a virtual machine that may be supported on computer system 330 will be described below with reference to FIG. 3. As is well known in the art, ROM acts to transfer data and instructions uni-directionally to the CPUs 332, while RAM is used typically to transfer data and instructions in a bi-directional manner. CPUs 332 may generally include any number of processors. Both primary storage devices 334, 336 may include any suitable computer-readable media. A secondary storage medium 338, which is typically a mass memory device, is also coupled bi-directionally to CPUs 332 and provides additional data storage capacity. The mass memory device 338 is a computer-readable medium that may be used to store programs including computer code, data, and the like. Typically, mass memory device 338 is a storage medium such as a hard disk or a tape which generally slower than primary storage devices 334, 336. Mass memory storage device 338 may take the form of a magnetic or paper tape reader or some other well-known device. It will be appreciated that the information retained within the mass memory device 338, may, in appropriate cases, be incorporated in standard fashion as part of RAM 336 as virtual memory. A specific primary storage device 334 such as a CD-ROM may also pass data uni-directionally to the CPUs 332.

CPUs 332 are also coupled to one or more input/output devices 1040 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPUs 332 optionally may be coupled to a computer or telecommunications network, e.g., an internet network or an intranet network, using a network connection as shown generally at 1012. With such a network connection, it is contemplated that the CPUs 332 might receive information from the network, or might output information to the network in the course of performing the above-described method steps. Such information, which is often represented as a sequence of instructions to be executed using CPUs 332, may be received from and outputted to the network, for example, in the form of a computer data signal embodied in a carrier wave. The above-described devices and materials will be familiar to those of skill in the computer hardware and software arts.

In accordance with various embodiments of the invention, an n-word subtraction using the SBBZ instruction can be followed by any conditional branch instruction which requires the status of the Z flag to determine if the condition defined by the comparison is met. For example, any processor having an instruction set that defines one or more conditional branches based on the relations: equal (=); not equal (≠); less than (<); less than or equal (≦); greater than (>); or greater than or equal (≧) and requires the status of the Z flag as listed in Table II can take advantage of the SBBZ instruction of the present invention.

While the invention has been described in relationship to the to the embodiments shown and described herein, other alternatives, embodiments, and modifications will be apparent to those skilled in the art. It is intended that the specification be only exemplary, and that the true scope and spirit of the invention be indicated by the following claims.

What is claimed is:

1. A method of comparing a first operand and a second operand, wherein the first operand is formed of n words where n is greater than or equal to 1 and the second operand is formed of n words wherein both the first operand is hierarchically arranged from a first operand lowest order word (LSW) to a first operand highest order word (MSW) and wherein the second operand is hierarchically arranged from a second operand lowest order word (LSW) to a second operand highest order word (MSW), comprising:

(a) subtracting the first operand lowest order word from a second operand lowest order word;

(b) if the result of the subtracting (a) is not zero, then clearing a zero (Z) flag such that a Z flag status is not set;

(c) if the result of the subtracting (a) is zero, then setting the Z flag such that the Z flag status is set;

(d) subtracting a first operand next higher order word from a second operand next higher order word;

(e) if the result of the subtracting (d) is not zero, then clearing the zero (Z) flag such that the Z flag status is not set;

(f) repeating (d)–(e) until the first operand highest order word is subtracted from the second operand highest order word; and wherein the comparing is followed by a conditional branch operation testing the Z flag, the conditional branch operation performed by a central processing unit (CPU).

2. A method as recited in claim 1, wherein the conditional branch operation is selected from a group testing for any of the following conditions: equal (=); not equal (≠); less than (<); less than or equal (≦); greater than (>); or greater than or equal (≧).

3. A CPU configured to execute a machine instruction requiring a comparison of two multi-word operands for execution comprising:

a zero (Z) flag;

subtraction circuitry configured to perform a subtraction operation on each of the words of the two multi-word operands respectively;

reset circuitry configured to reset the Z flag such that a Z flag status is not set if any of the subtraction operations on the two multi-word operands is not zero; and wherein the machine instruction defines a conditional branch instruction testing the Z flag.

4. The CPU of claim 3, further comprising circuitry to ascertain if the condition defined by the conditional branch instruction is met by analyzing the value of the Z flag after the subtraction circuitry performs the subtraction operation on each of the words of the two multi-word operands.

5. The CPU of claim 4, wherein the conditional branch instruction defines one of the following relations: equal (=); not equal (≠); less than (<); less than or equal (≦); greater than (>); or greater than or equal (≧).

6. A computer program product for comparing a first operand and a second operand, wherein the first operand is formed of n words where n is greater than or equal to 1 and the second operand is formed of n words wherein both the first operand is hierarchically arranged from a first operand lowest order word (LSW) to a first operand highest order word (MSW) and wherein the second operand is hierarchically arranged from a second operand lowest order word (LSW) to a second operand highest order word (MSW), comprising:

computer code for subtracting the first operand lowest order word from a second operand lowest order word;

computer code for determining if the result of the subtracting (a) is not zero, then clearing a zero (Z) flag such that a Z flag status is not set;

computer code for determining if the result of the subtracting (a) is zero, then setting the Z flag such that the Z flag status is set;

computer code for subtracting a first operand next higher order word from a second operand next higher order word;

computer code for determining if the result of the subtracting (d) is not zero, then clearing the zero (Z) flag such that the Z flag status is not set;

computer code for repeating (d)–(e) until the first operand highest order word is subtracted from the second operand highest order word;

a computer readable medium for storing the computer program product; and computer code for performing a conditional branch operation testing the Z flag, the computer code for performing a conditional branch operation configured to be performed by a central processing unit (CPU).

7. The computer program product as recited in claim 6, wherein the conditional branch operation is selected from a group testing for any of the following conditions: equal (=); not equal (≠); less than (<); less than or equal (≦); greater than (>); or greater than or equal (≧).

* * * * *